United States Patent [19]

Lange et al.

[11] Patent Number: 5,431,699
[45] Date of Patent: Jul. 11, 1995

[54] MIXTURES OF AZO DYES FOR NAVY TO BLACK HUES

[75] Inventors: Arno Lange, Bad Duerkheim; Uwe Nahr, Dannstadt-Schauernheim; Walter Sieber, Ingelheim; Volker Walther, Weisenheim, all of Germany

[73] Assignee: BASF Aktiengesellschaft, Ludwigshafen, Germany

[21] Appl. No.: 187,486

[22] Filed: Jan. 28, 1994

[30] Foreign Application Priority Data

Feb. 17, 1993 [DE] Germany .................. 43 04 744.0

[51] Int. Cl.⁶ .......................... D06P 1/18; D06P 3/54
[52] U.S. Cl. ........................................ 8/639; 8/662;
  8/691; 8/922; 8/917; 8/696; 8/533
[58] Field of Search .................. 8/638, 639, 640, 662,
  8/696, 691, 922, 917, 533, 638.40

[56] References Cited

U.S. PATENT DOCUMENTS 3,981,883 9/1976 Niess .
4,405,330 9/1983 Bergmann et al. .
4,985,044 1/1991 Hahnke et al. .
5,160,348 11/1992 Hoppe et al. ........................ 8/639

FOREIGN PATENT DOCUMENTS 0064221 11/1982 European Pat. Off. .
0346715 6/1988 European Pat. Off. .
0347685 12/1989 European Pat. Off. .
0526170 2/1993 European Pat. Off. .
2000038 7/1971 Germany ................. D06P 1/18
3112427 10/1982 Germany .
5-163442 6/1993 Japan .................... C09B 67/22

OTHER PUBLICATIONS

Patent Abstracts of Japan, 85-071749/12, No. 489, Jul. 22, 1983, JP-A-26060, Feb. 8, 1985, "Water Insoluble Disperse Dye Compsn.-Suitable for Dyeing or Printing Polyester Fibres".
Database WPI, Week 9042, Derwent Publications Ltd., London, GB; AN 90-316742 & JP-A-2 225 572 (Mitsui Toatsu Chemicals), 7 Sep. 1990.

*Primary Examiner*—Linda Skaling
*Assistant Examiner*—Margaret Einsmann
*Attorney, Agent, or Firm*—Oblon, Spivak, McClelland, Maier & Neustadt

[57] ABSTRACT

Dye mixtures contain
  a) one or more azo dyes of the formula I

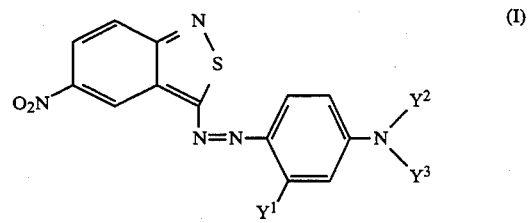

where
  $Y^1$ is hydrogen, $C_1$-$C_6$-alkyl, $C_1$-$C_4$-alkoxy or unsubstituted or substituted $C_1$-$C_8$-alkanoylamino or $C_3$- or $C_4$-alkenylamino or
  $Y^2$ and $Y^3$ are each hydrogen or unsubstituted or substituted $C_1$-$C_6$-alkyl
  b) the azo dye of the formula II

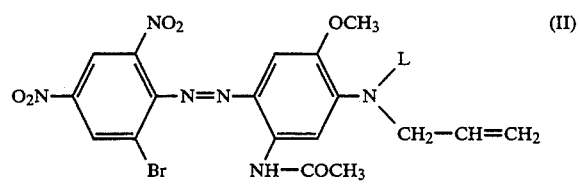

where L is allyl which may be partially replaced by or may furthermore be hydrogen and
  c) optionally, an azo dye of the formula III and/or IV as described in the specification.

6 Claims, No Drawings

MIXTURES OF AZO DYES FOR NAVY TO BLACK HUES

The present invention relates to novel dye mixtures containing, based in each case on the total weight of the dyes, a) from 10 to 90% by weight of one or more azo dyes of the formula I

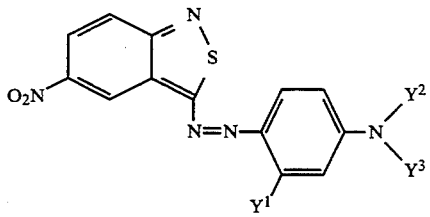

where

Y$^1$ is hydrogen, C$_1$-C$_6$-alkyl, C$_1$-C$_4$-alkoxy or C$_3$- or C$_4$-alkenoylamino or C$_1$-C$_8$-alkanoylamino which is unsubstituted or substituted by halogen, cyano, hydroxyl, C$_1$-C$_4$-alkoxy or C$_1$-C$_4$-alkanoyloxy and Y$^2$ and Y$^3$ independently of one another are each hydrogen or C$_1$-C$_6$-alkyl which is unsubstituted or substituted by hydroxyl, C$_1$-C$_4$-alkoxy, C$_1$-C$_4$-alkanoyloxy or C$_1$-C$_4$-alkoxycarbonyl, b) from 10 to 90% by weight of the azo dye of the formula IIa

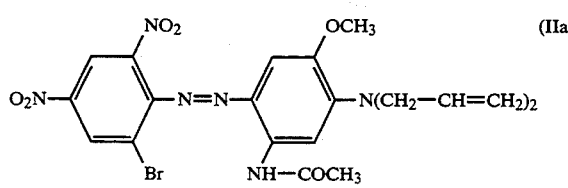

and, if required, of the dye of the formula IIb

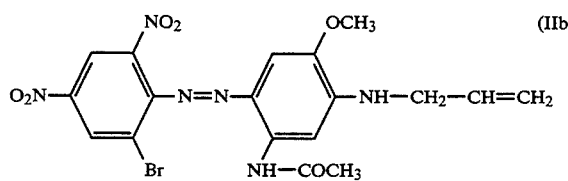

the amount of dye IIa being from 50 to 100% by weight and that of dye IIb being from 0 to 50% by weight, based in each case on the weight of dye IIa and IIb, and c) from 0 to 70% by weight of one or more azo dyes of the formula III or IV

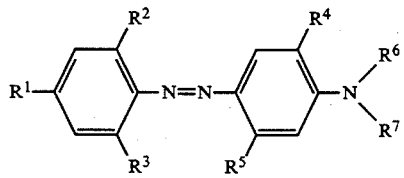

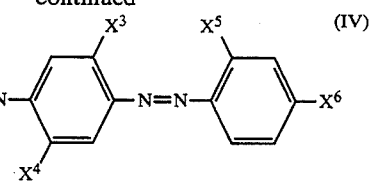

where

R$^1$ is nitro or C$_1$-C$_4$-alkylsulfonyl which is unsubstituted or substituted by hydroxyl, R$^2$ and R$^3$ independently of one another are each hydrogen, chlorine or bromine, R$^4$ and is hydrogen, chlorine or methyl R$^5$ is hydrogen or chlorine, R$^6$ and R$^7$ independently of one another are each hydrogen, phenyl or C$_1$-C$_4$-alkyl which is unsubstituted or substituted by hydroxyl, phenoxy, 2-cyanoethoxy, acetoxy, phenoxyacetoxy, benzoyloxy, methoxycarbonyloxy or phenylaminocarbonyloxy, or, if R$^2$ and R$^3$ are each hydrogen or chlorine, R$^6$ and R$^7$ are each furthermore C$_1$-C$_4$-cyanoalkyl, X$^1$ is hydrogen, hydroxyl, methoxy, acetylamino or nitro, X$^2$, X$^3$, X$^4$ and X$^5$ independently of one another are each hydrogen, methyl or methoxy and X$^6$ is hydroxyl, 2-hydroxyethoxy, formyl or methoxycarbonylamino, with the proviso that the sum of the dyes stated under a), b) and c) is 100% by weight, dye formulations containing the novel dye mixtures and the use of the novel dye mixtures for dyeing or printing polyester-containing substrates in textile form.

JP-A-26060/1985 and U.S. Pat. No. 4,405,330 disclose dye mixtures which contain, inter alia, the dye of the abovementioned formula IIa. However, it has been found that these dye mixtures still have deficiencies when used.

It is an object of the present invention to provide novel dye mixtures which likewise contain the dye of the formula IIa. When they are used, the novel mixtures should give navy to black hues and should have good performance characteristics.

We have found that this object is achieved by the dye mixtures defined at the outset.

All alkyl and alkenyl groups occurring in the formulae I, III and IV may be either straight-chain or branched.

If the alkyl radicals carry substituents, they are as a rule monosubstituted or disubstituted.

Y$^1$, Y$^2$ and Y$^3$ are, for example, methyl, ethyl, propyl, isopropyl, butyl, isobutyl, sec-butyl, tert-butyl, pentyl, neopentyl, tert-pentyl, hexyl or methylpentyl.

Y$^1$ may furthermore be, for example, acetylamino, propionylamino, butyrylamino, isobutyrylamino, 2-ethylhexanoylamino, methoxyacetylamino, ethoxyacetylamino, 2- or 3-methoxypropionylamino, chloroacetylamino, cyanoacetylamino, hydroxyacetylamino, acetoxyacetylamino, acroylamino or methacryloylamino.

Y$^2$ and Y$^3$ may each furthermore be, for example, 2-hydroxyethyl, 2- or 3-hydroxypropyl, 2- or 4-hydroxybutyl, 2-methoxyethyl, 2-ethoxyethyl, 2- or 3-methoxypropyl, 2- or 3-ethoxypropyl, 2- or 4-methoxybutyl, 2- or 4-ethoxybutyl, 2-acetoxyethyl, 2- or 3-acetoxypropyl, 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 4-methoxycarbonylbutyl or 2- or 4-ethoxycarbonylbutyl.

$R^1$ is, for example, methylsulfonyl, ethylsulfonyl, propylsulfonyl, isopropylsulfonyl, butylsulfonyl or 2-hydroxyethylsulfonyl.

$R^6$ and $R^7$ are each, for example, methyl, ethyl, propyl, isopropyl, butyl, isobutyl, sec-butyl, 2-hydroxyethyl, 2- or 3-hydroxypropyl, 2- or 4-hydroxybutyl, 2-phenoxyethyl, 2- or 3-phenoxypropyl, 2-(2-cyanoethoxy)ethyl, 2-acetoxyethyl, 2-phenoxyacetoxyethyl, 2-benzoyloxyethyl, 2-methylcarbonyloxyethyl, 2-phenylaminocarbonyloxyethyl or 2-cyanoethyl.

Preferred dye mixtures are those containing at least one azo dye of the formula III or IV, where $R^1$ is nitro, $R^2$ and $R^3$ are each hydrogen or chlorine, $R^4$ is hydrogen, chlorine or methyl, $R^5$ is hydrogen, and $R^6$ and $R^7$ independently of one another are each hydrogen, phenyl or $C_1$–$C_4$-alkyl or are each ethyl which is substituted by hydroxyl, phenoxy, 2-cyanoethoxy, acetoxy, phenoxyacetoxy, benzyloxy, methoxycarbonyloxy, phenylaminocarbonyloxy or cyano and $X^1$, $X^2$, $X^3$, $X^4$, $X^5$ and $X^6$ each have the abovementioned meanings.

Mixtures containing at least one azo dye of the formula III or IV are noteworthy, these azo dyes having the following substitution pattern.

Mixtures containing at least one azo dye of the formula IIId, IIIk or IVb are particularly noteworthy.

Advantageous dye mixtures are those which contain from 70 to 90% by weight of the dye of the formula IIa and from 10 to 30% by weight of the dye of the formula IIb, the percentages in each case being based on the weight of the dyes IIa and IIb.

Dye mixtures which contain one or more dyes of the formula I, where $Y^1$ is hydrogen or methyl, have particularly high color strength.

Other dye mixtures having particularly high color strength are those which contain a dye of the formula I, where $Y^2$ and $Y^3$ independently of one another are each $C_1$–$C_4$-alkyl which is unsubstituted or substituted by hydroxyl or $C_1$–$C_4$-alkoxycarbonyl.

Dye mixtures for black hues contain in particular a) from 15 to 60% by weight of at least one azo dye of the formula I, b) from 15 to 60% by weight of the azo dye of the formula IIa and, if required, of the formula IIb and c) from 35 to 65% by weight of at least one azo dye of the formula III or IV, the percentages in each case being based on the total weight of the dyes, with the proviso that the sum of the dyes stated under a), b) and c) is 100% by weight.

Dye mixtures for navy hues contain in particular a) from 17 to 80% by weight of at least one azo dye of the formula I, b) from 17 to 80% by weight of the azo dye of the formula IIa and, if required, of the formula IIb and c) from 3 to 20% by weight of at least one azo dye of the formula III or IV, the percentages in each case Dyes of the formula III:

| | $R^1$ | $R^2$ | $R^3$ | $R^4$ | $R^5$ | $R^6$ | $R^7$ |
|---|---|---|---|---|---|---|---|
| a) | $NO_2$ | H | H | H | H | H | H |
| b) | $NO_2$ | H | H | H | H | $CH_3$ | $NCC_2H_4$ |
| c) | $NO_2$ | H | H | H | H | $C_2H_5$ | $NCC_2H_4$ |
| d) | $NO_2$ | H | H | H | H | $C_4H_9$ | $NCC_2H_4$ |
| e) | $NO_2$ | H | H | H | H | $CH_3COOC_2H_4$ | $NCC_2H_4$ |
| f) | $NO_2$ | H | H | H | H | $C_6H_5$ | H |
| g) | $NO_2$ | H | H | $CH_3$ | H | $HOC_2H_4$ | H |
| h) | $NO_2$ | Cl | Cl | H | H | $CH_3$ | $HOC_2H_4$ |
| i) | $NO_2$ | Cl | Cl | H | H | $HOC_2H_4$ | $HOC_2H_4$ |
| j) | $NO_2$ | Cl | Cl | H | H | $HOC_2H_4$ | $C_2H_5$ |
| k) | $NO_2$ | Cl | Cl | H | H | $CH_3COOC_2H_4$ | $NCC_2H_4$ |
| l) | $NO_2$ | H | H | H | H | $C_6H_5NHCOOC_2H_4$ | $NCC_2H_4$ |
| m) | $NO_2$ | H | H | H | H | $C_6H_5OCH_2COOC_2H_4$ | $NCC_2H_4$ |
| n) | $NO_2$ | H | H | Cl | H | H | $HOC_2H_4OH$ |
| o) | $NO_2$ | H | H | Cl | H | $CH_3COOC_2H_4$ | $CH_3COO_2H_4$ |
| p) | $NO_2$ | Cl | Cl | H | H | $HOC_2H_4$ | $NCC_2H_4$ |
| q) | $NO_2$ | Cl | Cl | H | H | $C_6H_5OCOC_2H_4$ | $NCC_2H_4$ |
| r) | $NO_2$ | H | H | H | H | $CH_3COOC_2H_4$ | $CH_3COOC_2H_4$ |
| s) | $NO_2$ | Cl | Cl | Cl | H | H | $NCC_2H_4$ |
| t) | $NO_2$ | Cl | Cl | H | H | $CH_3OCOOC_2H_4$ | $CH_3OCOOC_2H_4$ |
| u) | $NO_2$ | Cl | Cl | H | H | $CH_3COOC_2H_4$ | $CH_3COOC_2H_4$ |
| v) | $NO_2$ | H | H | H | H | $NCC_2H_4OC_2H_4$ | $NCC_2H_4$ |
| w) | $NO_2$ | H | H | H | H | $C_6H_5OCOC_2H_4$ | $NCC_2H_4$ |
| x) | $NO_2$ | Cl | Cl | Cl | H | $C_6H_5OC_2H_4$ | $NCC_2H_4$ |
| y) | $HOC_2H_4SO_2$ | Cl | Cl | H | Cl | $C_2H_5$ | $C_2H_5$ |

Dyes of the formula IV:

| | $X^1$ | $X^2$ | $X^3$ | $X^4$ | $X^5$ | $X^6$ |
|---|---|---|---|---|---|---|
| a) | $NO_2$ | H | H | H | H | HO |
| b) | $NO_2$ | H | $CH_3O$ | H | H | HO |
| c) | $NO_2$ | H | $CH_3O$ | $CH_3$ | H | HO |
| d) | H | H | $CH_3O$ | $CH_3O$ | H | HO |
| e) | HO | H | $CH_3$ | H | H | CHO |
| f) | HO | H | $CH_3$ | $CH_3O$ | H | $HOC_2H_4O$ |
| g) | HO | $CH_3$ | H | H | $CH_3$ | HO |
| h) | H | H | $CH_3O$ | $CH_3$ | H | HO |
| i) | HO | H | $CH_3$ | H | H | $CH_3OCONH$ |
| j) | $CH_3O$ | H | H | $CH_3$ | H | HO |
| k) | $CH_3OCONH$ | H | H | $CH_3$ | H | HO |
| l) | $NO_2$ | H | $CH_3$ | $CH_3$ | H | $OC_2H_4O$ | being based on the weight of the dyes, with the proviso that the sum of the dyes stated under a), b) and c) is 100% by weight.

The dyes of the formulae I, IIa, IIb, III and IV are in general known dyes. They are known, for example, from U.S. Pat. No. 3,981,883, DE-A-3 112 427 or EP-A-64 221 or from Venkataraman, The Chemistry of Synthetic Dyes, Vol. III, pages 444 to 447, and can be obtained by the methods stated there.

The novel dye mixtures are prepared by a conventional method, for example by mixing the particular components in the stated weight ratio. If necessary, the further components, for example dispersants, such as ligninsulfonates or sulfonation products of the reaction product of formaldehyde with aromatics, or other assistants, may be added to the novel mixtures. It is also possible to mix already prepared dye formulations of the particular components or prepared dye formulations with pure dyes.

Accordingly, the present invention furthermore relates to dye formulations containing from 15 to 60% by weight, based on the weight of the dye formulation, of a dye mixture defined at the outset and from 40 to 85% by weight, based on the weight of the dye formulation, of a dispersant.

The novel dye mixtures are suitable for dyeing or printing polyester-containing substrates in textile form. According to the invention, these include textile forms such as fibers, knitted fabrics or woven fabrics of polyester or blended fabrics of polyester with cotton, wool or cellulose acetate or triacetate, polyester/wool blends being noteworthy. Dyeings or prints in navy to black hues are obtained. The dyeing and printing processes are known per se. Further details can also be found in the Examples.

The novel dye mixtures give deep dyeings and have a neutral night shade. They also have excellent production properties.

The Examples which follow illustrate the invention.

Dyeing method for polyester 10 g of polyester fabric are added at 50° C. to 200 ml of a dye liquor which contains X% by weight, based on the polyester fabric, of a dye formulation and whose pH has been brought to 4.5 by means of acetic acid. The treatment is carried out for 5 minutes at 50° C., after which the temperature of the liquor is increased to 130° C. in the course of 30 minutes and the liquor is kept at this temperature for 60 minutes and then allowed to cool to 60° C. in the course of 20 minutes.

Thereafter, the dyed polyester fabric is reductively cleaned by treating it at 65° C. in 200 ml of a liquor which contains 5 ml/l of 32% strength by weight sodium hydroxide solution, 3 g/l of sodium dithionite and 1 g/l of an adduct of 48 mol of ethylene oxide with 1 mol of castor oil for 15 minutes. Finally, the fabric is washed, neutralized with dilute acetic acid, washed again and dried.

Dyeing method for polyester/wool blends

The dyeing is carried out similarly to the above method for polyester except that heating is carried out to no higher than 120° C. and this temperature is maintained for only 30 minutes. (In order to protect the wool, formaldehyde or a formaldehyde donor may also be added.)

The abovementioned dye formulation contains 40% by weight of dye mixture and 60% by weight of a dispersant based on ligninsulfonate, the percentages in each case being based on the weight of the formulation.

The dye mixture has the composition shown in the Table below, the following dyes being used.

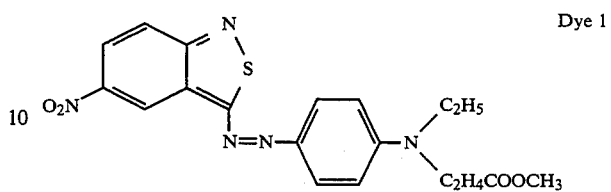

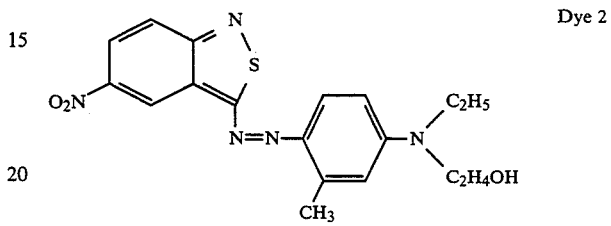

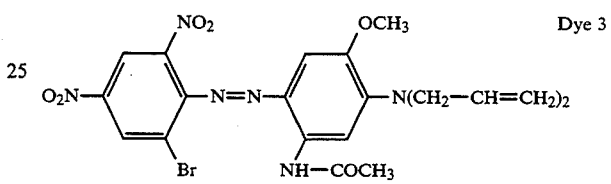

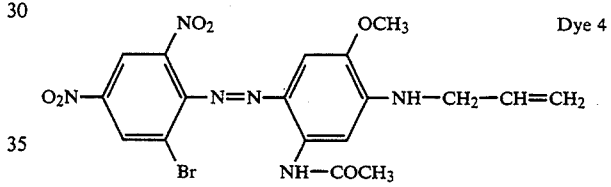

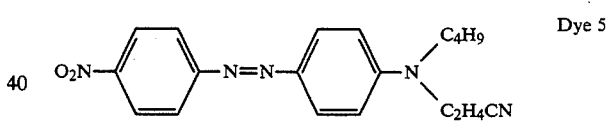

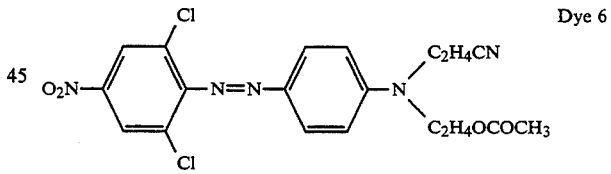

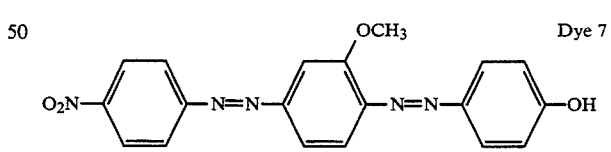

| Example No. | Dye No. 1 | 2 | 3 | 4 | 5 | 6 | 7 | Amount X of dye formulation [% by weight] |
|---|---|---|---|---|---|---|---|---|
| | [% by weight, based on the weight of the dye mixture] | | | | | | | |
| 1 | 19 | 0 | 33 | 0 | 48 | 0 | 0 | 2.8 |
| 2 | 0 | 20 | 34 | 0 | 46 | 0 | 0 | 2.9 |
| 3 | 10 | 10 | 33 | 0 | 47 | 0 | 0 | 2.7 |
| 4 | 19 | 0 | 28 | 5 | 48 | 0 | 0 | 2.5 |
| 5 | 0 | 20 | 25 | 9 | 46 | 0 | 0 | 3.0 |
| 6 | 20 | 0 | 25 | 0 | 0 | 55 | 0 | 2.9 |
| 7 | 0 | 24 | 21 | 0 | 0 | 55 | 0 | 2.7 |
| 8 | 30 | 0 | 28 | 0 | 0 | 0 | 42 | 2.6 |
| 9 | 0 | 32 | 28 | 0 | 0 | 0 | 40 | 2.5 |

-continued

| Example No. | Dye No. 1 | 2 | 3 | 4 | 5 | 6 | 7 | Amount X of dye formulation [% by weight] |
|---|---|---|---|---|---|---|---|---|
| | [% by weight, based on the weight of the dye mixture] | | | | | | | |
| 10 | 38 | 0 | 53 | 0 | 10 | 0 | 0 | 1.7 |
| 11 | 0 | 36 | 54 | 0 | 9 | 0 | 0 | 1.6 |
| 12 | 18 | 20 | 53 | 0 | 9 | 0 | 0 | 1.6 |
| 13 | 38 | 0 | 45 | 8 | 10 | 0 | 0 | 1.5 |
| 14 | 0 | 36 | 40 | 14 | 9 | 0 | 0 | 1.9 |
| 15 | 49 | 0 | 40 | 0 | 0 | 11 | 0 | 1.8 |
| 16 | 0 | 55 | 34 | 0 | 0 | 11 | 0 | 1.8 |
| 17 | 40 | 0 | 52 | 0 | 0 | 0 | 8 | 1.9 |
| 18 | 0 | 44 | 48 | 0 | 0 | 0 | 8 | 1.9 |

Both on polyester fabric and on polyester/wool blended fabric (55:45 w/w), deep black dyeings are obtained with the mixture of Examples 1 to 9 and deep navy dyeings with those of Examples 10 to 18.

We claim:

1. A dye mixture consisting essentially of, based in each case on the total weight of the dyes,
   a) from 10 to 90% by weight of one or more azo dyes of the formula I

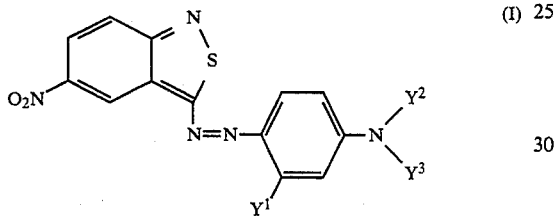

where
Y$^1$ is hydrogen, C$_1$-C$_6$-alkyl, C$_1$-C$_4$-alkoxy or C$_3$- or C$_4$-alkenoylamino or C$_1$-C$_8$-alkanoylamino which is unsubstituted or substituted by halogen, cyano, hydroxyl, C$_1$-C$_4$-alkoxy or C$_1$-C$_4$-alkanoyloxy and Y$^2$ and Y$^3$ independently of one another are each hydrogen or C$_1$-C$_6$-alkyl which is unsubstituted or substituted by hydroxyl, C$_1$-C$_4$-alkoxy, C$_1$-C$_4$-alkanoyloxy or C$_1$-C$_4$-alkoxycarbonyl, b) from 10 to 90% by weight of the azo dye of the formula IIa

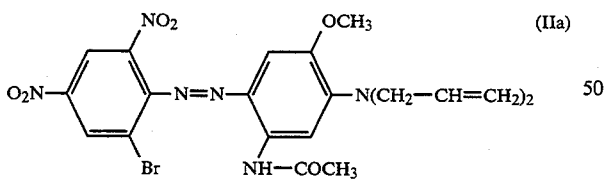

and optionally the dye of the formula IIb

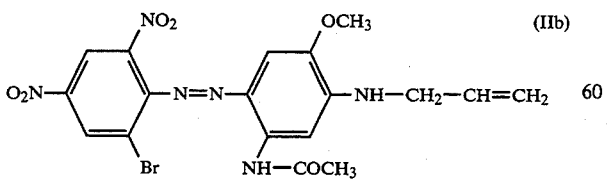

the amount of dye IIa being from 50 to 100% by weight and that of dye IIb being from 0 to 50% by weight, based in each case on the weight of dye IIa and IIb, and c) from 0 to 70% by weight of one or more azo dyes of the formula III or IV

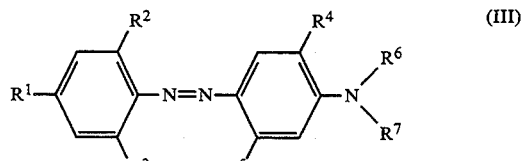

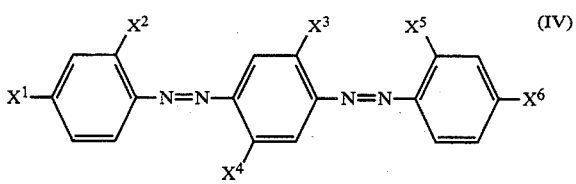

where
R$^1$ is nitro or C$_1$-C$_4$-alkylsulfonyl which is unsubstituted or substituted by hydroxyl,
R$^2$ and R$^3$ independently of one another are each hydrogen, chlorine or bromine,
R$^4$ is hydrogen, chlorine or methyl,
R$^5$ is hydrogen or chlorine,
R$^6$ and R$^7$ independently of one another are each hydrogen, phenyl or C$_1$-C$_4$-alkyl which is unsubstituted or substituted by hydroxyl, phenoxy, 2-cyanoethoxy, acetoxy, phenoxyacetoxy, benzoyloxy, methoxycarbonyloxy or phenylaminocarbonyloxy, or, if R$^2$ and R$^3$ are each hydrogen or chlorine, R$^6$ and R$^7$ are each furthermore C$_1$-C$_4$-cyanoalkyl,
X$^1$ is hydrogen, hydroxyl, methoxy, acetylamino or nitro,
X$^2$, X$^3$, X$^4$ and X$^5$ independently of one another are each hydrogen, methyl or methoxy and
X$^6$ is hydroxyl, 2-hydroxyethoxy, formyl or methoxycarbonylamino,
with the proviso that the sum of the dyes stated under a), b) or c) is 100% by weight.

2. A dye mixture as claimed in claim 1, containing at least one azo dye of the formula III or IV, where
R$^1$ is nitro,
R$^2$ and R$^3$ are each hydrogen or chlorine,
R$^4$ is hydrogen, chlorine or methyl,
R$^5$ is hydrogen and
R$^6$ and R$^7$ independently of one another are each hydrogen, phenyl or C$_1$-C$_4$-alkyl or are each ethyl which is substituted by hydroxyl, phenoxy, 2-cyanoethoxy, acetoxy, phenoxyacetoxy, benzoyloxy, methoxycarbonyloxy, phenylaminocarbonyloxy or cyano
and X$^1$, X$^2$, X$^3$, X$^4$, X$^5$ and X$^6$ each have the meanings stated in claim 1.

3. A dye mixture as claimed in claim 1, containing at least one azo dye of the formula I, where Y$^1$ is hydrogen or methyl.

4. A dye formulation containing from 15 to 60% by weight, based on the weight of the dye formulation, of a dye mixture as claimed in claim 1 and from 40 to 85% by weight, based on the weight of the dye formulation, of a dispersant.

5. A method for dyeing or printing polyester-containing substrates comprising: contacting a polyester-containing substrate in textile form with a dye mixture of claim 1.

6. A method for dyeing or printing polyester/wool blends comprising: contacting a polyester/wool blend in textile form with a dye mixture of claim 1.

* * * * *